C. D. RICE.
MILLING MACHINE.
APPLICATION FILED MAY 26, 1920.

1,407,820.

Patented Feb. 28, 1922.
6 SHEETS—SHEET 2.

UNITED STATES PATENT OFFICE.

CHARLES D. RICE, OF WEST HARTFORD, CONNECTICUT.

MILLING MACHINE.

1,407,820.  Specification of Letters Patent.  Patented Feb. 28, 1922.

Application filed May 26, 1920. Serial No. 384,355.

*To all whom it may concern:*

Be it known that I, CHARLES D. RICE, a citizen of the United States, residing at West Hartford, in the county of Hartford and State of Connecticut, have invented a new and useful Improvement in Milling Machines, of which the following is a specification.

This invention relates more particularly to those machine tools which are known as single-purpose milling machines, that, is those milling machines which have a limited range of action and are provided for use in establishments where large quantities of a single product are required and the machine is normally kept running for long periods producing duplicate pieces, although of course when desired the operations of such machines can be varied to a limited extent by change of cutter and alteration of feed.

The object of the invention is to provide a machine of this character which is simple, inexpensive and rugged in construction, and powerful, rapid and accurate in action, whereby a heavy cut of exact dimensions can be quickly completed in one large piece or a large number of small pieces, as required, at each cycle of operation, which consists in feeding the table and carrying the work to and beneath the cutter at approved speeds, then returning the table and stopping the machine with the cover in starting position, the cutter being raised while the table is returning so that the work will not be marred or the cutter dulled by chips, thus insuring an efficient quantity production from the machine.

The invention is illustrated and described herein as embodied in a machine of the type which comprises broadly a work carrying table that is reciprocated on the top of a firm bed, and an oscillatory cutter head that is securely locked down to the bed when the table is feeding and the cutter is milling but is caused to oscillate and lift the cutter after the cut has been completed so as to allow the work to pass freely beneath the cutter when the table returns, the table feed mechanism and the cutter head lock mechanism being enclosed within the bed and the driving mechanism being stopped after each feed and return movement of the table.

The bed 1 is a substantial box-shaped casting. The table 2 is movable horizontally back and forth on a level surface on top near one side of the bed, being retained and guided in its movements by gibs 3 that extend into grooves in the edges of the table and are secured to the bed by bolts 4, Figs. 1, 2. The table is in the form of a rectangular tray with the usual means for the attachment of the work holding vise to its upper surface within the side walls which are of sufficient height to retain oil and chips. A pipe 5 leads from the rear of the table and opens above a tank 6 mounted on the back of the bed, for the discharge of oil from the table, Figs. 4, 5.

The table on its under side is connected by a link 7 with the upper end of a lever 8 that at its lower forked end is hinged to a fulcrum stud 9 which is held in a boss 10 extending inwardly from near the bottom of the bed. The upper end of the lever desirably has a lug 11 which projects loosely into a recess 12 in the under side of the bed to prevent the lever from turning with the fulcrum stud and swinging out of position. In a recess in the front edge of the lever is a roll 13 which is adapted to be engaged by the feed cam 14 that is secured to the cam shaft 15. The lever is held with the roll against the cam by means of a spring 16. The front end of this spring is secured to a nut 17 that is adjustably connected with the front wall of the bed by a bolt 18. The rear end of the spring is engaged with a rod 19 that has one end bearing against a shoe 20 on the back of the lever and the other end loosely connected with the rear wall of the bed by bolt 200, Figs. 5, 6. The feed movement of the table is given by the cam, lever and link and the return movement by the spring as permitted by the cam. The contour of this cam is shaped according to the cut to be made, and it is situated under the neutral center of the table.

Figure 13:
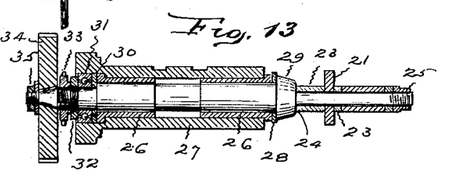
Fig. 13 is a longitudinal section through the spindle sleeve on plane denoted by dotted line 13—13 on Fig. 12.

The milling cutter 21, which may be any width and diameter within the limits of the machine and depending upon the work to be performed, is secured over the medial line of the table to the cutter spindle 22. Collars 23 are slipped upon the spindle between the cutter and a shoulder 24 on the spindle and between the cutter and the fastening nut 25 that is screwed upon the end of the spindle, for retaining the cutter in the desired position. The collars used are of necessity of different lengths depending upon the width of the cutter and the position it occupies on the spindle. The cutter spindle is rotarily mounted in a pair of bearing bushings 26 with flanged ends that are thrust into opposite ends of the spindle sleeve 27. A thrust washer 28 is located in the spindle between the outer flanged end of the front bushing and a collar 29 fixed on the spindle, and a thrust washer 30 is located on the spindle between the outer flanged end of the rear bushing and an anti-friction bearing 31 of common type that is held in a recess in the sleeve by an adjusting nut 32 which is screwed upon the spindle so as to retain the bearing and adjust the spindle in the bearing bushings. The anti-friction bearing sustains such loads as result from the overhanging end of the spindle. Screwed upon the spindle outside of the adjusting nut is a sprocket wheel 33 and keyed upon a tapering section of the spindle outside of the sprocket is the spindle driving gear 34, this gear being held in place by a nut 35 that is screwed upon the end of the spindle. The adjusting nut is preferably screwed upon a left hand thread while the sprocket wheel is screwed upon a right hand thread, so that the sprocket wheel may be used to lock the adjusting nut in the required position, Fig. 13.

Figures 12, 14, 15:
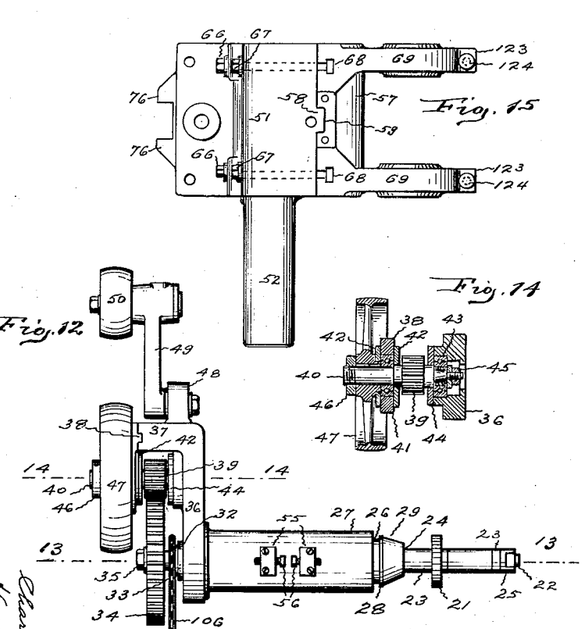
Fig. 12 is an elevation showing the cutter spindle sleeve and the parts which it carries removed from the spindle head.
Fig. 14 is a section on plane denoted by dotted line 14—14 on Fig. 12.
Fig. 15 is a plan of the spindle bearing head and the oscillatory bracket which carries it.

Extending radially from the end of the spindle sleeve is an arm 36 with an angular projection 37 at the outer end of which a bracket 38 is fastened, Fig. 12. Between the arm and bracket is a pinion 39 that is a little wider than the gear on the mill spindle with which it meshes. The outer end of the arbor 40 of this pinion is supported by a common anti-friction bearing 41 which is held in an opening in the bracket by cap plates 42 fastened to the sides of the bracket and the inner end of the arbor is supported by a common anti-friction bearing 43 which is held in an opening in the arm by a cap plate 44. The inner end of the arbor is desirably tapered so that the arbor may be easily withdrawn from the bearing when the retaining nut 45 is unscrewed. Keyed on the outer end of the pinion arbor and retained by a clamp nut 46 is a driving pulley 47, Fig. 14. When the nut is removed from the inner end of the pinion arbor and the bracket is unfastened from the arm, the arbor with the pinion and outer bearing is free to be removed. For higher speed the gear 34 and pinion 39 could be omitted and the pulley secured directly to the spindle.

Extending from the angular end of the arm is a lug 48 and bolted to this lug is an arm 49 which carries an idler pulley 50. This arm can be adjusted to compensate for any vertical adjustment of the head and for stretch of the belt, and fastened in the required position for the idler pulley to keep the driving belt tight, Figs. 3, 12.

The spindle sleeve carrying the mill spindle with the cutter, sprocket and driving gear, and the attached arm carrying the arbor with the driving gear, driving pulley and idler pulley is clamped in the desired position in an opening in a head 51. This head on one side has a projecting horn 52 and clamped in a suitable location on this horn is a hanger 53 with an opening containing a bearing for supporting the outer end of the mill spindle, Figs. 1, 2.

Figures 1, 10, 17:
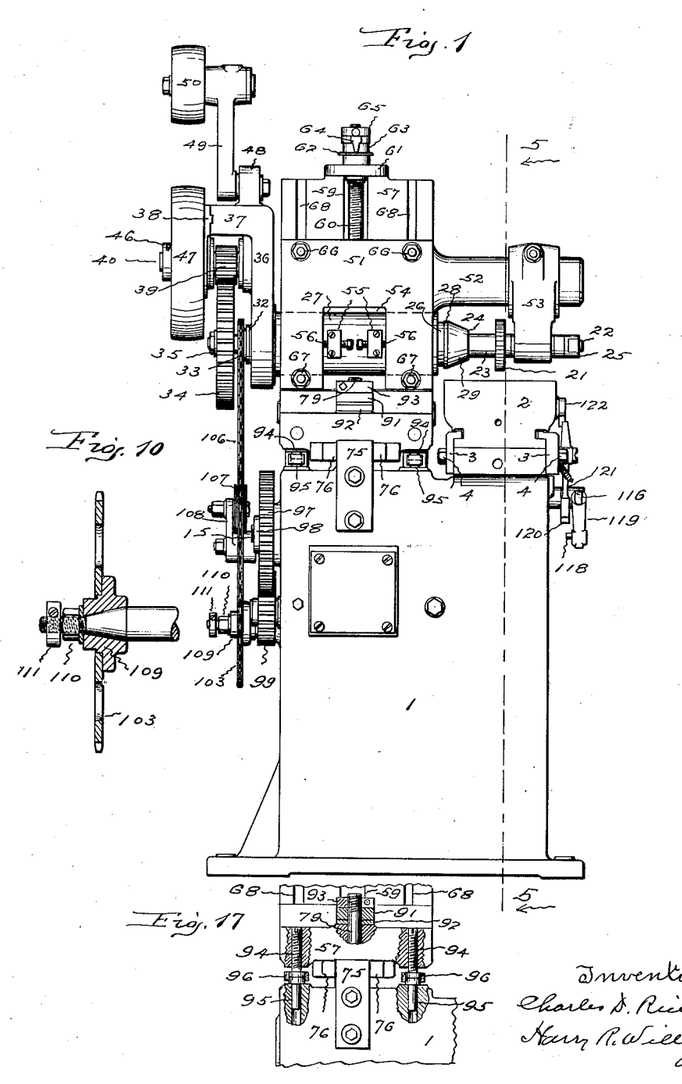
Fig. 1 of the accompanying drawings shows a front elevation of a machine that embodies the invention.
Fig. 10 is a sectional view illustrating a method of connecting the feed driving-sprocket to the end of its shaft.
Fig. 17 is a front view of the lower end of the spindle head bracket and upper end of the bed with parts broken away.

In the front of the head is an opening 54. Two blocks 55 are secured to the front of the spindle sleeve where it is exposed in this opening in the head. Screws 56 turn through threaded holes in these blocks and butt against the side walls of the opening. The milling cutter is roughly positioned by means of the collars slipped on the spindle each side of it. To obtain a fine adjustment of the cutter the screws 56 are manipulated and the sleeve and all it carries adjusted one way or the other until the cutter is exactly right. Fig. 1.

Figure 4:
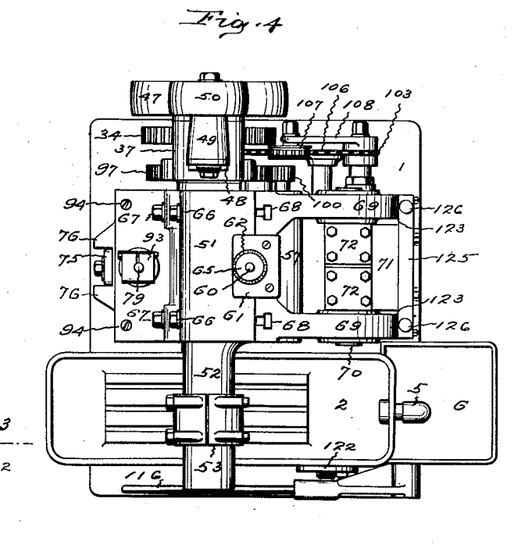
Fig. 4 shows a top plan of the machine.

The spindle bearing head is adjustably fastened to the front face of the oscillatory bracket 57. Extending vertically on the back of the head is a tongue 58 that projects into a vertical groove 59 in the front face of the bracket for guiding the head in its vertical movement with relation to the bracket. The head is moved up and down to attain the desired vertical adjustment of the cutter by means of a screw 60 that turns through a plate 61 secured to the top of the bracket, into a threaded hole in the top of the head. Above the plate is an indexed dial 62 and above the dial is a nut 63 carrying a hand 64 that points to the dial graduations. Above the pointer nut a knob 65 is secured to the end of the adjusting screw for turning it. By this means the head carrying the cutter spindle can be adjusted very exactly and the degree of movement noted. After the head has been adjusted it is locked in proper position by bolts 66 and 67 that extend horizontally through the head and have their T-shaped heads located in correspondingly shaped mortices 68 in the front face of the bracket. The lower bolts 67, besides securing the bottom of the head to the bracket, clamp the spindle bearing sleeve in the head. Figs. 1, 4, 15.

Figure 6:
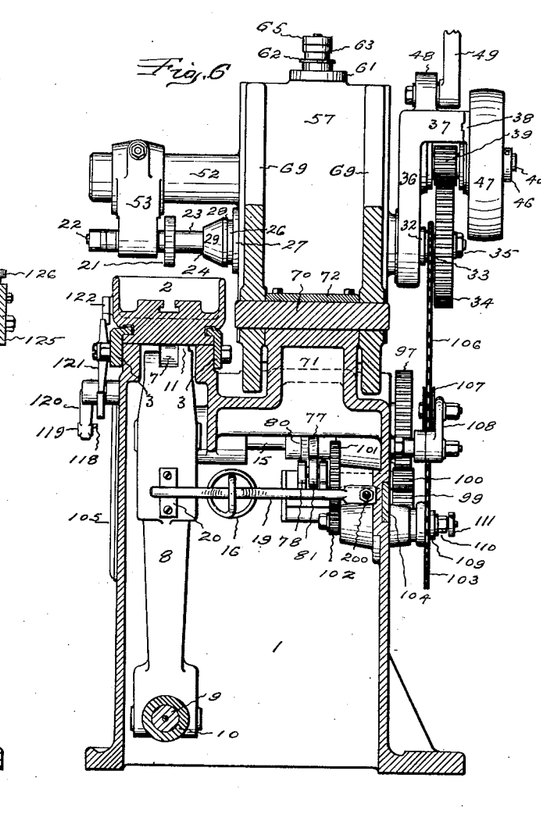
Fig. 6 is a vertical section taken on the plane indicated by the dotted lines 6—6 on Figs. 5 and 7.
Figures 7, 8, 9:
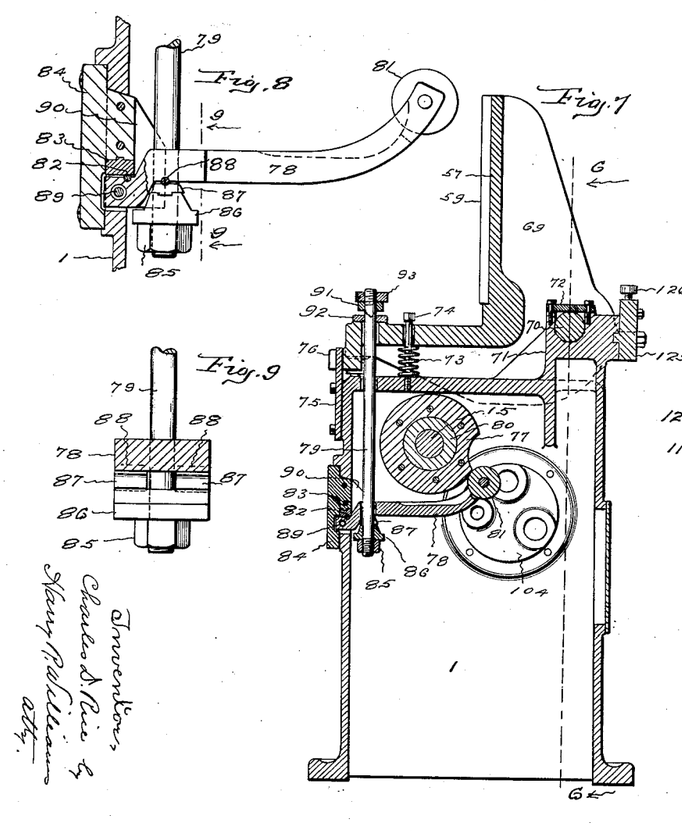
Fig. 7 is a vertical section through the oscillatory spindle-head-bracket and cam-lever and bolt for locking the bracket down on the bed.
Fig. 8 is a view on larger scale of the bracket locking lever, the lower end of the locking bolt and connections.
Fig. 9 is a section on the plane indicated by the dotted line 9—9 on Fig. 8.

The head carrying bracket is substantially L-shaped with a web 69 at each side on the back and bottom. In the webs at the angle between the vertical rear member and horizontal front member of the bracket there are journal bearings for the ends of the horizontal axle 70 upon which the bracket with the head and spindle oscillates. The axle is set in a suitably formed groove, desirably angular, in an upward extension 71 at the back of the bed and is clamped tightly therein by floating plates 72 which after they are adjusted so as to thrust against the bracket webs are bolted to the top of this upward extension. By this means the axle is solidly held with its ends extending into the widely separated bearing openings in the webs at the back of the bracket which is held from any sidewise movement. Figs. 4, 6, 7.

The front end of the bracket is raised for lifting the milling cutter above the work, by a suitable spring 73 arranged between the top of the bed and the under side of the forwardly extending horizontal section of the bracket, the distance of lift being limited by the head of the screw bolt 74 that passes through the bracket and the spring and into the bed. Fig. 7. A plate 75 fastened to the front of the bed extends upwardly between a pair of lugs 76 projecting from the front of the lower part of the bracket for guiding the bracket and preventing the front end from being forced out of position by undue pressure or from swaying or vibrating while the cutter is at work. Figs. 1, 4, 7.

The bracket is locked down on the top of the bed with the mill in working position by a cam 77, lever 78 actuated by the cam, and rod 79 which is connected between the lever and the front of the bracket, Fig. 7.

Figures 5, 16:
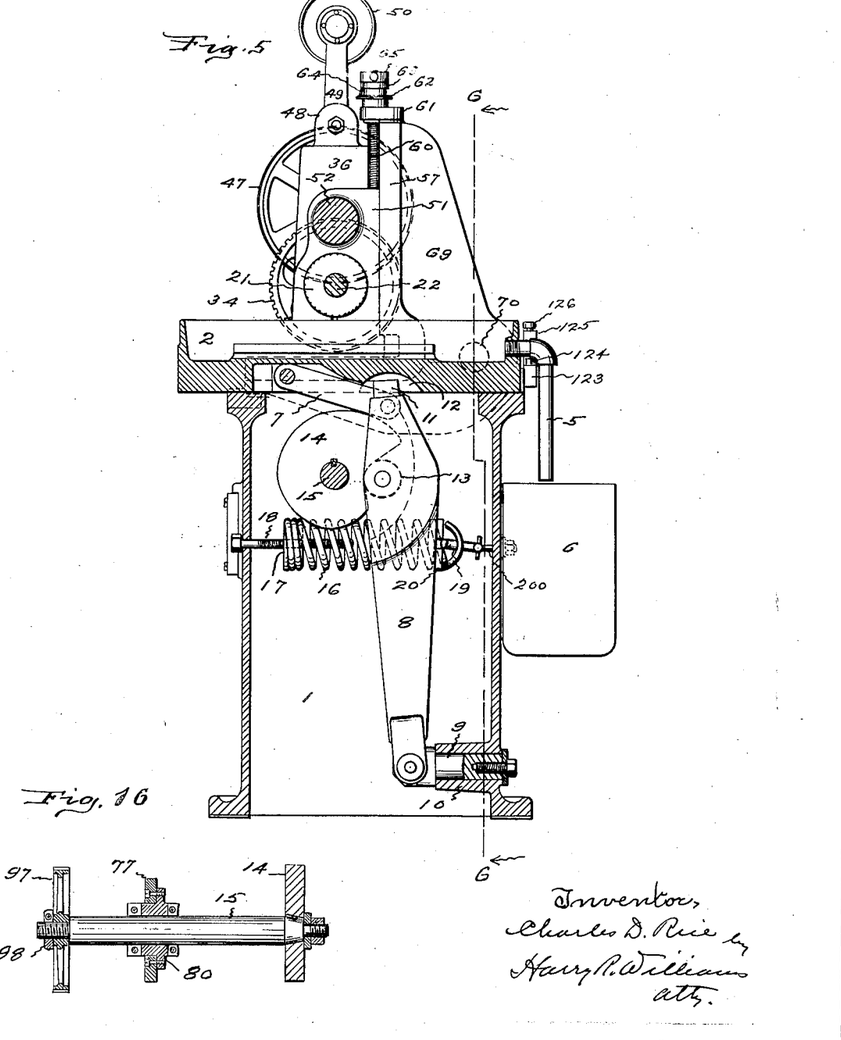
Fig. 5 is a vertical section on the plane indicated by the dotted line 5—5 and looking in the direction of the arrows on Fig. 1.
Fig. 16 is a view of the shaft with the table feed cam, head locking cam, and cam shaft gear in section.

The locking cam 77 is made in the form of a ring and is fastened to the flanged sleeve 80 that has its ends slotted and is clamped upon the cam shaft 15 in the neutral center of the bracket. Figs. 7, 16.

On the swinging or power end of the locking lever 78 is a roll 81 that engages the locking cam. The fulcrum of the locking lever is a roll 82 which is held between the lever and a fulcrum shoe 83 secured to a plate 84 that closes an opening in the front wall of the bed. Figs. 7, 8. The lower end of the locking rod 79 passes through an opening in the lever and has a nut 85 above which is a block 86 with shoes 87 between which and the under side of the lever are load contact rolls 88. When the locking cam forces the roll downward the lever rocks on the fulcrum roll 82 and owing to the relative short distance between the fulcrum and the load rolls 88 the rod is drawn down powerfully. A pin 89 is passed loosely through a hole in the end of the lever to prevent accidental displacement of the lever during transportation. Side plates 90 are attached to the fulcrum plate 84 for keeping the lever from sidewise displacement. The locking lever and its roll can be removed through the opening in the front wall of the bed when the fulcrum plate is unfastened, after the locking rod has been disconnected. Figs. 7, 8, 9.

The upper end of the locking rod extends through an opening near the front end of the horizontal arm of the bracket. On the locking rod and provided with downwardly extending knife edges is a hardened plate 91, the knife edges of which are designed to rest in grooves in a plate 92 that is fastened on the upper surface of the bracket. Screwed upon the threaded upper end of the rod and clamped in position is an adjusting nut 93. By adjusting this nut to the proper degree the cam through the lever and rod will lock the bracket down with the required firmness. Figs. 1, 7.

Figures 3, 19:
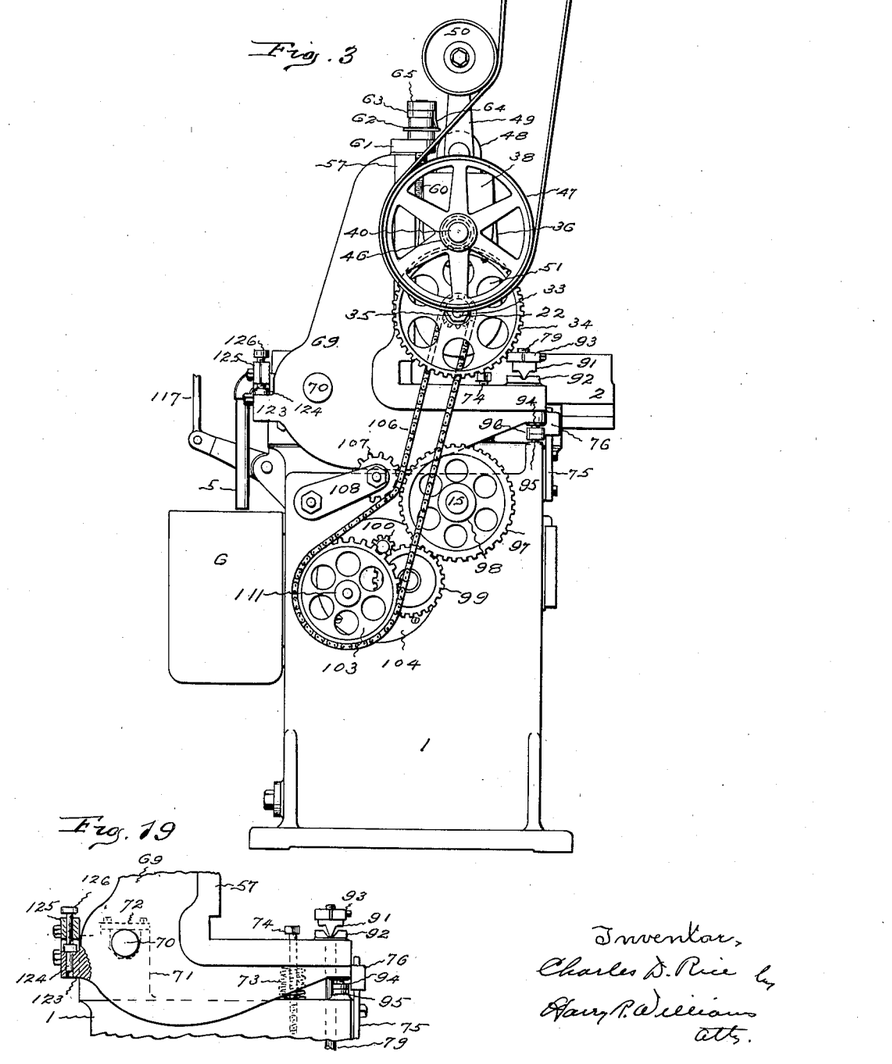
Fig. 3 is an elevation looking from the left side.
Fig. 19 shows the means for holding the bracket tightly locked.

In order to ensure the exact positioning of the bracket when its front end is locked down, it is provided near the front with two hardened steps 94 which may or may not be vertically adjustable. The faces of these steps are adapted to rest upon the faces of two hardened steps 95 that are set in openings in the upper surface of the bed. The steps carried by the bracket may be threaded and slotted and by turning them the exact depth of cut may be determined. Sleeves 96 are placed around the steps having a drive fit on the upper steps to prevent dust or chips getting between them and affecting the adjustment. Figs. 1, 17. To further secure the bracket, relieve the axle and eliminate possibility of vibration lugs 123 are extended from the webs 69 and studs 124 are set in these lugs. Fastened to the upright extension 71 on the bed between the webs is a plate 125, the ends of which overhang the lugs and bear set screws 126 that are adjusted to engage the studs when the bracket is drawn down. By this means the bracket is clamped down upon the axle and through the axle and the steps at the front of the bracket is locked down upon the bed at four corners when the cutter is at work. Figs. 3, 4, 19.

Figures 2, 11:
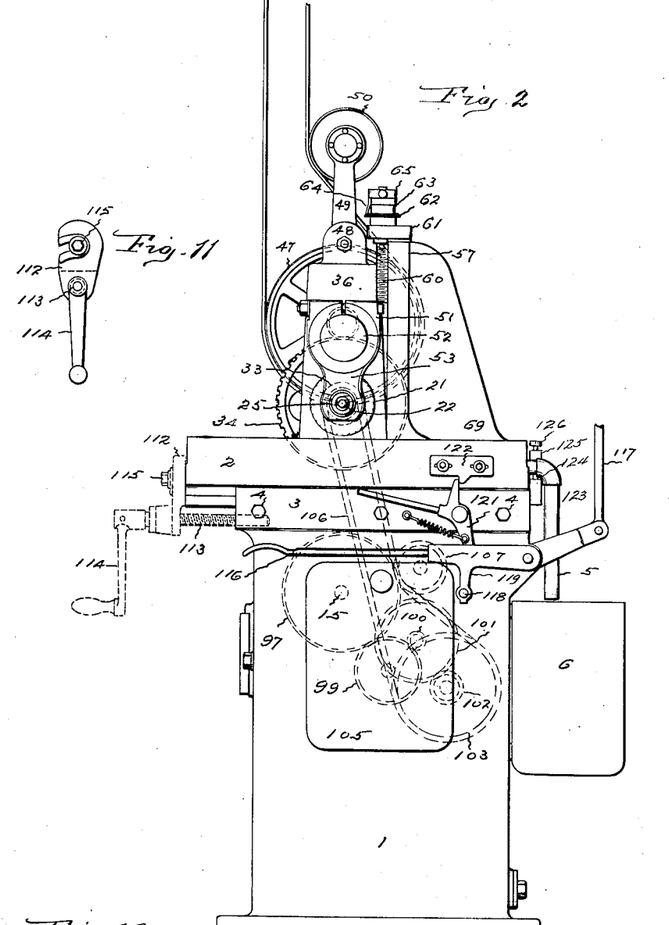
Fig. 2 is an elevation of the machine looking from the right side.
Fig. 11 is a side view of a hand feed screw that may be applied to the bed and table for feeding the latter, as illustrated in dotted outline on Fig. 2.

On the outer end of the cam shaft 15, a driving gear 97 is screwed and fastened by a clamp nut 98. Figs. 3, 16. Meshing with the cam-shaft driving-gear is a gear 99 that meshes with a pinion 100 on the outside of the bed. Fig. 3. This pinion is secured to an arbor that on the inside of the bed has a gear 101 in mesh with a pinion 102 which is attached to an arbor that on the outside of the bed bears a sprocket wheel 103. Fig. 6. The arbors of the gear 99, pinion 100, gear 101, pinion 102 and sprocket wheel 103 are held in bearings in a circular plate 104, Fig. 7, that is fastened in an opening in the side wall of the bed. The inside gear and pinion may be reached through an opening in the rear wall of the bed and others of different ratio substituted for changing the feed. The feed cam 14 may be reached for substituting another by removing the plate 105 on the wall under the table. Fig. 2.

The sprocket wheel 103 is connected by a chain 106 with the sprocket wheel 33 on the mill spindle 22 inside of the driving gear 34. An idler sprocket 107 is mounted on an adjustable arm 108 pivoted to the side wall of the bed, for the purpose of giving the proper tension to the sprocket chain. Fig. 3. The hub 109 of the sprocket wheel 103 is held on the tapering end of its spindle by a clamping nut 110 and a split nut 111, the split nut being adjusted so that the clamping nut can be unscrewed slightly for loosening the sprocket wheel and thus releasing the power feed. Fig. 10. A bracket 112 with a screw 113 and crank handle 114 is provided for feeding the table by hand when the sprocket 103 is loosened, and trying out the cutter on the work. The screw is turned into a threaded opening in the front of the bed and the bracket is swung up and clamped by the bolt 115 to the table for this purpose. Figs. 2, 11. After the machine has been set properly for the desired work the hand feed screw may be removed and stored in the bed.

Figure 18:
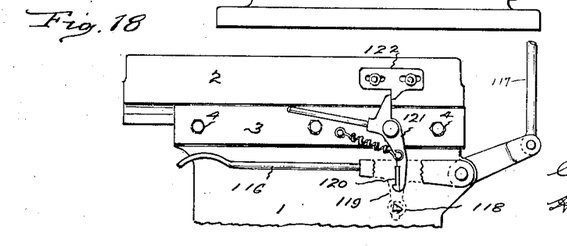
Fig. 18 is a detail view of the starting and stopping mechanism.

When the machine is set up for use the driving pulley 47 is belted to a pulley connected in the ordinary way by an old form of brake clutch with an overhead countershaft (not shown). To start the machine in operation the handle 116 which is pivoted to the side of the bed is raised. This through the rod 117 allows the clutch to engage. When the handle is lifted a catch stud 118 extending from an arm 119 that projects from the handle is engaged by a hook 120 fastened to the end of the latch 121. This holds the handle lifted with the clutch in. The machine continues in operation until the table carries the work to and beneath the milling cutter and then returns to starting position, at which time the stop plate 122 that is adjustably fastened to the side of the table engages the upper end of the latch and pushing it forward releases the handle which can then drop and allow the clutch to release and stop the machine. Figs. 2, 18.

The feed cam feeds the table according to its contour and the spring when allowed by the cam qiuckly returns the table. The cams are so timed that as the table starts to return the locking cam releases the locking lever and rod and permits the spring to lift the bracket and head carrying the milling cutter spindle so that the milling cutter is raised above the work so that chips will not dull the cutter or rough up and mar the work. When the table reaches its starting position the machine stops for the removal of the piece or pieces operated upon and the insertion of fresh work. As the machine is again started up the locking cam acting through the lever and rod locks the bracket down with the mill in position to cut. With this machine the cycle of operation feeds and returns the table and then stops, the cutter head bracket being firmly locked down upon the rigid bed when the table is fed and being lifted when the table is returned. The cutters are adjustable and changeable for varying the cuts to be made. The large deep table collects the oil and chips and prevents them from interfering with the actions of the mechanisms, particularly the table slide, the cams being protected within the bed. For changing speed, gears of different ratio may be substituted. For varying the relations of feed and locking the cams may be altered, but the machine is normally designed for routine work, that is, for cutting a large number of duplicate pieces without change, that is, it is intended to run on the same line of work for a long period. The machine is ruggedly built and is primarily designed to do heavy work, that is, all the work required with one cut.

The invention claimed is:—

1. A milling machine comprising a bed, a table slidable on the bed, a head pivotally mounted on the bed, mechanism for coordinately reciprocating the table horizontally and oscillating the head vertically, a mill spindle rotarily mounted in the head, and mechanism for rotating the spindle.

2. A milling machine comprising a bed, a table slidable on the bed, mechanism for reciprocating the table horizontally, a head pivotally mounted on the bed on an axis at right angles to the line of reciprocation of the table, mechanism for oscillating the head vertically, a mill spindle rotarily mounted in the head with its axis parallel with the axis of the head, and mechanism for rotating the spindle.

3. A milling machine comprising a bed, a table movable horizontally on the bed, mechanism for reciprocating the table, a head pivotally mounted on the bed, means for turning the head up from the bed, mechanism for locking the head down to the bed, a mill spindle rotarily mounted in the head, and mechanism for rotating the spindle.

4. A milling machine comprising a bed, a table movable horizontally on the bed, mechanism for reciprocating the table, a head pivotally mounted on the bed, a spring for swinging the head up from the bed, a cam, lever and rod for locking the head down to the bed, a mill spindle rotarily mounted in the head, and mechanism for rotating the spindle.

5. A milling machine comprising a bed, a table slidable on the bed, a cam, lever and link for moving the table horizontally in one direction, a spring for moving the table in the other direction, a head pivotally mounted on the bed, mechanism for oscillating the head vertically, a mill spindle rotarily mounted in the head, and mechanism for rotating the spindle.

6. A milling machine comprising a bed, a table movable horizontally on the bed, a cam, lever and link for moving the table in one direction, a rotatable stud pivotally connecting said lever to the bed, a spring for moving the table in the other direction, a head pivotally mounted on the bed, means for lifting the head above the bed, mechanism for locking the head down to the bed, a mill spindle rotarily mounted in the head, and mechanism for rotating the spindle.

7. A milling machine comprising a bed, a table movable horizontally on the bed, a cam, lever and link for moving the table in one direction, a rotatable stud pivotally connecting said lever to the bed, a projection from the lever extending into an opening in the table for preventing said lever from turning on said stud, a spring for moving the table in the other direction, a head pivotally mounted on the bed, means for lifting the head above the bed, mechanism for locking the head down to the bed, a mill spindle rotarily mounted in the head, and mechanism for rotating the spindle.

8. A milling machine comprising a bed, a table movable horizontally on the bed, a cam, lever and link for moving the table in one direction, a rod bearing against said lever, and a spring engaged with said rod for moving the table in the other direction, a head pivotally mounted on the bed, mechanism for oscillating the head vertically, a mill spindle rotarily mounted in the head, and mechanism for rotating the spindle.

9. A milling machine comprising a bed, a table movable horizontally on the bed, mechanism for reciprocating the table, a bracket pivotally mounted on the bed, mechanism for oscillating the bracket vertically, a head adjustably mounted on the bracket, means for adjusting the head vertically, a mill spindle rotarily mounted in the head, and mechanism for rotating the spindle.

10. A milling machine comprising a bed, a table movable horizontally on the bed, mechanism for reciprocating the table, a bracket pivotally mounted on the bed, mechanism for oscillating the bracket vertically, a head adjustably mounted on the bracket, a screw for adjusting the head vertically, indexing means for showing the adjustment of the head, a mill spindle rotarily mounted in the head, and mechanism for rotating the spindle.

11. A milling machine comprising a bed, a table movable horizontally on the bed, mechanism for reciprocating the table, a bracket pivotally mounted on the bed, mechanism for oscillating the bracket vertically, a head mounted on the bracket, a sleeve mounted in the head, a spindle rotarily mounted in the sleeve, and mechanism for rotating the spindle.

12. A milling machine comprising a bed, a table movable horizontally on the bed, mechanism for reciprocating the table, a bracket pivotally mounted on the bed, mechanism for oscillating the bracket vertically, a head adjustably mounted on the bracket, mechanism for adjusting the head vertically, a sleeve longitudinally adjustable in the head, mechanism for adjusting the sleeve, a spindle rotarily mounted in the sleeve, and mechanism for rotating the spindle.

13. A milling machine comprising a bed, a table movable horizontally on the bed, mechanism for reciprocating the table, a bracket pivotally mounted on the bed, mechanism for oscillating the bracket vertically, a head mounted on the bracket, a sleeve mounted in the head, a spindle rotarily mounted in the sleeve, and spindle driving mechanism mounted on the sleeve.

14. A milling machine comprising a bed, a table movable horizontally on the bed, mechanism for reciprocating the table, a bracket pivotally mounted on the bed, mechanism for oscillating the bracket vertically, a head mounted on the bracket, a sleeve mounted in the head, adjustable means carried by the sleeve and engaging the head for positioning the sleeve, a spindle carried by the sleeve, and mechanism for rotating the spindle.

15. A milling machine comprising a bed, a table movable horizontally on the bed, mechanism for reciprocating the table, a bracket pivotally mounted on the bed, mechanism for oscillating the bracket vertically, a head mounted on the bracket, a sleeve mounted in the head, adjustable means carried by the sleeve and engaging the head, a spindle carried by the sleeve, mechanism for rotating the spindle, a cutter on the spindle, and removable collars on the spindle for locating the cutter.

16. A milling machine comprising a bed, a table movable horizontally on the bed, mechanism for reciprocating the table, a bracket pivotally mounted on the bed, mechanism for oscillating the bracket vertically, a head mounted on the bracket, a sleeve mounted in the head, an arm extending radially from the sleeve, a spindle rotarily mounted in the sleeve, and gearing mounted on said arm for rotaing the spindle.

17. A milling machine comprising a bed, a table movable horizontally on the bed, mechanism for reciprocating the table, a bracket pivotally mounted on the bed, mechanism for oscillating the bracket vertically, a head mounted on the bracket, a sleeve mounted in the head, an arm extending radially from the sleeve, a spindle rotarily mounted in the sleeve, a gear secured on said spindle, and a pulley and pinion mounted on said arm for driving said spindle gear.

18. A milling machine comprising a bed, a table movable horizontally on the bed, mechanism for reciprocating the table, a bracket pivotally mounted on the bed, mechanism for oscillating the bracket vertically, a head mounted on the bracket, a sleeve mounted in the head, spindle bearing bushings located in the sleeve, an anti-friction bearing mounted in one end of the sleeve, a spindle supported by said bushings and bearing, and mechanism for rotating the spindle.

19. A milling machine comprising a bed, a table movable horizontally on the bed, mechanism for reciprocating the table, a bracket pivotally mounted on the bed, mechanism for oscillating the bracket vertically, means secured to the bed for guiding the swinging end of the bracket, a head mounted on the bracket, a sleeve mounted in the head, a spindle rotarily mounted in the sleeve, and mechanism for rotating the spindle.

20. A milling machine comprising a bed, a table movable horizontally on the bed, mechanism for reciprocating the table, a bracket pivotally mounted on the bed, mechanism for oscillating the bracket vertically, a head mounted on the bracket, a horn extending from the head, a sleeve mounted within the head, a spindle rotarily mounted in the sleeve, mechanism for rotating the spindle, and a bearing hanger mounted on said horn for supporting the outer end of the spindle.

21. A milling machine comprising a bed, a table movable horizontally on the bed, mechanism for reciprocating the table, a bracket pivotally mounted on the bed, mechanism for oscillating the bracket vertically, a head adjustably secured on the bracket, a sleeve mounted in the head and held by the head securing means, a spindle rotarily mounted in the sleeve, and mechanism for rotating the spindle.

22. A milling machine comprising a bed, a table movable horizontally on the bed, mechanism for reciprocating the table, a bracket pivotally mounted on the bed, mechanism for oscillating the bracket vertically, a head mounted on the bracket, a sleeve secured in the head, bearing bushings located in the sleeve, an anti-friction bearing located in one end of the sleeve, a horn extending from the head, a bearing hanger secured to said horn, a spindle supported by said bushings, bearing and hanger, a gear secured to the spindle, an arm extending radially from said sleeve, and means mounted on said arm for driving the spindle gear.

23. A milling machine comprising a bed, a table movable horizontally on the bed, mechanism for reciprocating the table, an L-shaped bracket mounted on a horizontal axle clamped to the bed, mechanism for oscillating the bracket vertically, mechanism for locking the bracket down to the bed, a head secured to the bracket, a mill spindle roatrily mounted in the head, and mechanism for rotating the spindle.

24. A milling machine comprising a bed, a table movable horizontally on the bed, mechanism for reciprocating the table, an L-shaped bracket pivotally mounted on a horizontal axle clamped to the bed, mechanism for oscillating the bracket vertically and for locking the front end of the bracket down upon the bed, adjustable means engaged by the bracket when locked down to clamp it on the axle, a head secured to the bracket, a mill spindle rotarily mounted in the head, and mechanism for rotating the spindle.

25. A milling machine comprising a bed, a table movable horizontally on the bed, mechanism for reciprocating the table, an L-shaped bracket pivotally mounted on a horizontal axle clamped in a groove in the top of the bed, a spring for lifting the front end of the bracket from the bed, means for limiting the upward movement of the front end of the bracket, a cam, lever and rod for locking the front end of the bracket down to the bed, a head secured to the bracket, a mill spindle rotarily mounted in the head, and mechanism for rotating the spindle.

26. A milling machine comprising a bed, a table movable horizontally on the bed, mechanism for reciprocating the table, an L-shaped bracket with webs extending on back and bottom, an axle extending through said webs at the angle, means clamping said axle to the bed, mechanism for oscillating the bracket, a head secured to the front of the bracket, a mill spindle rotarily mounted in the head with its axis parallel with the axis of the bracket, and mechanism for rotating the spindle.

27. A milling machine comprising a bed with a grooved extension on top near the back, a table movable forward and backward on the bed, mechanism for reciprocating the table, a bracket with webs spanning said grooved extension, an axle clamped in said grooved extension and projecting into said webs, mechanism for oscillating the bracket, a head secured to the bracket, a mill spindle rotarily mounted in the head, and mechanism for rotating the spindle.

28. A milling machine comprising a bed, a table movable horizontally on the bed, mechanism for reciprocating the table, a bracket pivotally mounted on the bed, a spring for swinging the bracket up from the bed, a locking cam, a locking lever, a rod extending between the lever and the swinging end of the bracket for locking the bracket down to the bed, a mill spindle rotarily mounted on the bracket, and mechanism for rotating the spindle.

29. A milling machine comprising a bed, a table movable horizontally on the bed, mechanism for reciprocating the table, a bracket pivotally mounted on the bed, a spring for swinging the bracket up from the bed, a locking cam, a locking lever, a locking rod with a hardened knife edge adjustable on said rod and engaging a hardened plate on the swinging end of the bracket for locking the bracket down to the bed, a mill spindle rotarily mounted on the bracket, and mechanism for rotating the spindle.

30. A milling machine comprising a bed, a table movable horizontally on the bed, mechanism for reciprocating the table, a bracket pivotally mounted on the bed, means for turning the bracket up from the bed, mechanism for locking the bracket down on the bed, hardened studs on the bed, hardened screws on the bracket adapted to seat on the studs when the bracket is locked down, a mill spindle rotarily mounted on the bracket, and mechanism for rotating the spindle.

31. A milling machine comprising a bed, a table movable horizontally on the bed, mechanism for reciprocating the table, a bracket pivotally mounted on the bed, means for swinging the bracket up from the bed, a cam, lever and connection between the lever and bracket for locking the bracket down to the bed, said lever being loosely mounted in a plate detachably secured to the bed, a mill spindle rotarily mounted on the bracket, and mechanism for rotating the spindle.

32. A milling machine comprising a bed, a table movable horizontally on the bed, mechanism for reciprocating the table, a bracket pivotally mounted on the bed, a means for swinging the bracket up from the bed, a cam, lever and rod for locking the head down to the bed, said lever being loosely connected to the bed and working on a fulcrum roll between it and the bed and load rolls between it and the rod, a mill spindle rotarily mounted on the bracket, and mechanism for rotating the spindle.

33. In a milling machine a bed with a plate detachably secured in an opening in the wall of the bed, a spindle bracket pivotally mounted on the bed, and mechanism for locking the bracket down to the bed, said locking mechanism comprising a cam, a lever, and a rod connecting the lever with the swinging end of the bracket, a fulcrum roll interposed between the end of the lever and said plate, and load rolls interposed between the lever and shoes on the lower end of the rod.

34. In a milling machine a bed, a spindle bracket pivotally mounted on the bed, mechanism for locking the bracket down to the bed, said locking mechanism comprising a cam, a lever, and a rod connecting the lever with the swinging end of the bracket, a hardened plate mounted on the swinging end of the bracket, hardened knife edges on the upper end of the bolt engaging said plate, and means for securing the knife edges in the required position on the bolt.

35. In a milling machine a bed, a spindle bracket pivotally mounted on the bed, and mechanism for locking the bracket down to the bed, said locking mechanism comprising a cam, a lever, and a rod connecting the lever with the swinging end of the bracket, contact rolls interposed between the under side of the lever and the lower end of the rod, and reduced contact edges interposed between the top side of the bracket and the upper end of the rod.

36. A milling machine comprising a bed with a plate detachably secured to its side wall, a table movable horizontally on the bed, mechanism for reciprocating the table, a bracket pivotally mounted on the bed, means for swinging the bracket up from the bed, a cam, lever and connection between the lever and bracket for locking the bracket down to the bed, a gear on the cam shaft, gearing mounted in bearings in said detachable plate for driving the cam shaft gear, a mill spindle rotarily mounted on the bracket, and mechanism for rotating the spindle.

37. A milling machine comprising a bed with a plate detachably secured to its side wall, a table movable horizontally on the bed, means including a cam and spring for reciprocating the table, a bracket pivotally mounted on the bed, a spring, cam, lever and rod for oscillating the bracket, change gears mounted on said detachable plate, and a driving connection between said change gears and the shaft bearing the cams.

38. A milling machine comprising a bed, a table movable horizontally on the bed, mechanism including driving gears for reciprocating the table, releasable means for reciprocating the table manually, a bracket pivotally mounted on the bed, means for turning the bracket up from the bed, mechanism for locking the bracket down to the bed, a mill spindle rotarily mounted on the bracket, and mechanism for rotating the spindle.

39. A milling machine comprising a bed, a table movable on the bed, a head pivotally mounted on the bed, mechanism including driving gearing for coordinately reciprocating the table horizontally and oscillating the head vertically, means for disconnecting the driving gearing, detachable means for reciprocating the table when the driving gearing is disconnected, a mill spindle rotarily mounted in the head, and mechanism for rotating the spindle.

40. A milling machine comprising a bed, a table movable on the bed, a head pivotally mounted on the bed, mechanism for coordinately reciprocating the table horizontally and oscillating the head vertically, a starting lever pivotally mounted on the bed, a latch on the bed for retaining the starting lever in operative position, and means attached to the table and adapted to engage the latch and release the starting lever from operative position after each feed and return movement of the table.

41. A milling machine comprising a bed, a table movable horizontally on the bed, mechanism for reciprocating the table, a bracket pivotally mounted on the bed, means for turning the bracket up from the bed, mechanism for locking the bracket down on the bed, hardened studs on the bed, hardened screws on the bracket adapted to seat on the studs when the bracket is locked down, sleeves enclosing the abutting ends of said studs and screws, a mill spindle rotarily mounted on the bracket, and mechanism for rotating the spindle.

42. A milling machine comprising a bed, a table movable horizontally on the bed, mechanism for reciprocating the table, a bracket pivotally mounted on the bed, means for turning the bracket up from the bed, mechanism for locking the bracket down on the bed, adjustable means carried by the bracket for determining its position when locked down, a mill spindle rotarily mounted on the bracket, and mechanism for rotating the spindle.

43. A milling machine comprising a bed, a table movable horizontally on the bed, mechanism for reciprocating the table, a bracket pivotally mounted on the bed, means for swinging the bracket up from the bed, hardened steps on the bed, hardened steps on the bracket, means for locking the bracket down with the steps in engagement, a mill spindle rotarily mounted on the bracket, and mechanism for rotating the spindle.

44. A milling machine comprising a bed, a table movable horizontally on the bed, mechanism for reciprocating the table, a bracket pivotally mounted on the bed, means for swinging the bracket up from the bed, seating steps between the swinging end of the bracket and the bed, protecting sleeves encasing said steps, means for locking the bracket down with the steps in engagement, a mill spindle mounted on the bracket, and mechanism for rotating the bracket.

45. A milling machine comprising a bed, a table movable horizontally on the bed, mechanism for reciprocating the table, a bracket pivotally mounted on a horizontal axle clamped to the bed, mechanism for oscillating the bracket vertically and for locking the front end of the bracket down upon the bed, means adapted to be engaged by the bracket when the bracket is locked down, for clamping the bracket on the axle, a spindle rotarily mounted on the bracket, and mechanism for rotating the spindle.

46. A milling machine comprising a bed, a table movable horizontally on the bed, mechanism for reciprocating the table, a bracket pivotally mounted on a horizontal axle, mechanism for oscillating the bracket vertically, mechanism for drawing down the swinging end of the bracket, means below the bracket in front of the axle for positioning the swinging end of the bracket and means above the bracket in back of the axle for positioning the pivoted end of the bracket when drawn down.

47. A milling machine comprising a bed, a table movable horizontally on the bed, mechanism for reciprocating the table, a bracket pivotally mounted on a horizontal axle, mechanism for oscillating the bracket vertically, mechanism for drawing down the swinging end of the bracket and means below and in front of the axle and means above and in back of the axle engaged by the bracket when swung down.

48. A milling machine comprising a bed, a table movable horizontally on the bed, mechanism for reciprocating the table, a bracket pivotally mounted on a horizontal axle, means for swinging up the front end of the bracket, mechanism for drawing the front end of the bracket down, and means engaged by the bracket in back of the axle when the bracket is drawn down in front to clamp it on the bed.

49. A milling machine comprising a bed, a table movable horizontally on the bed, mechanism for reciprocating the table, a bracket pivotally mounted on a horizontal axle, mechanism for oscillating the bracket vertically, mechanism for drawing down the swinging end of the bracket, underneath seating means for the bracket at the front and overhead seating means for the bracket at the rear when the bracket is drawn down.

50. A milling machine comprising a bed, a table movable horizontally on the bed, mechanism for reciprocating the table, a bracket pivotally mounted on a horizontal axle, mechanism for oscillating the bracket vertically, mechanism for drawing the front end of the bracket down, and two steps underneath the bracket at the front and two screws above the bracket at the rear for holding the bracket when drawn down.

CHARLES D. RICE.